2,817,862
MEAT CLEANING MACHINE

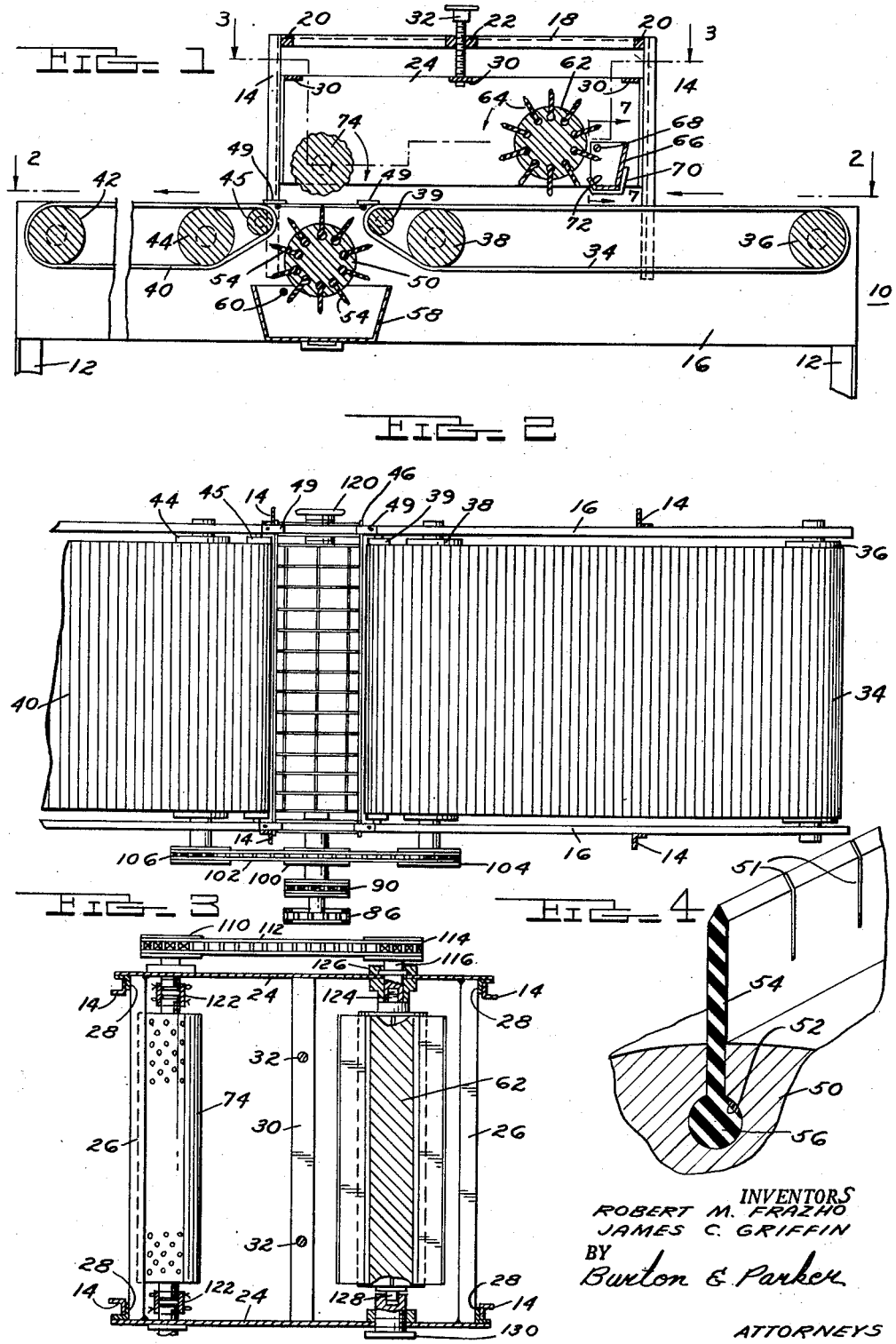

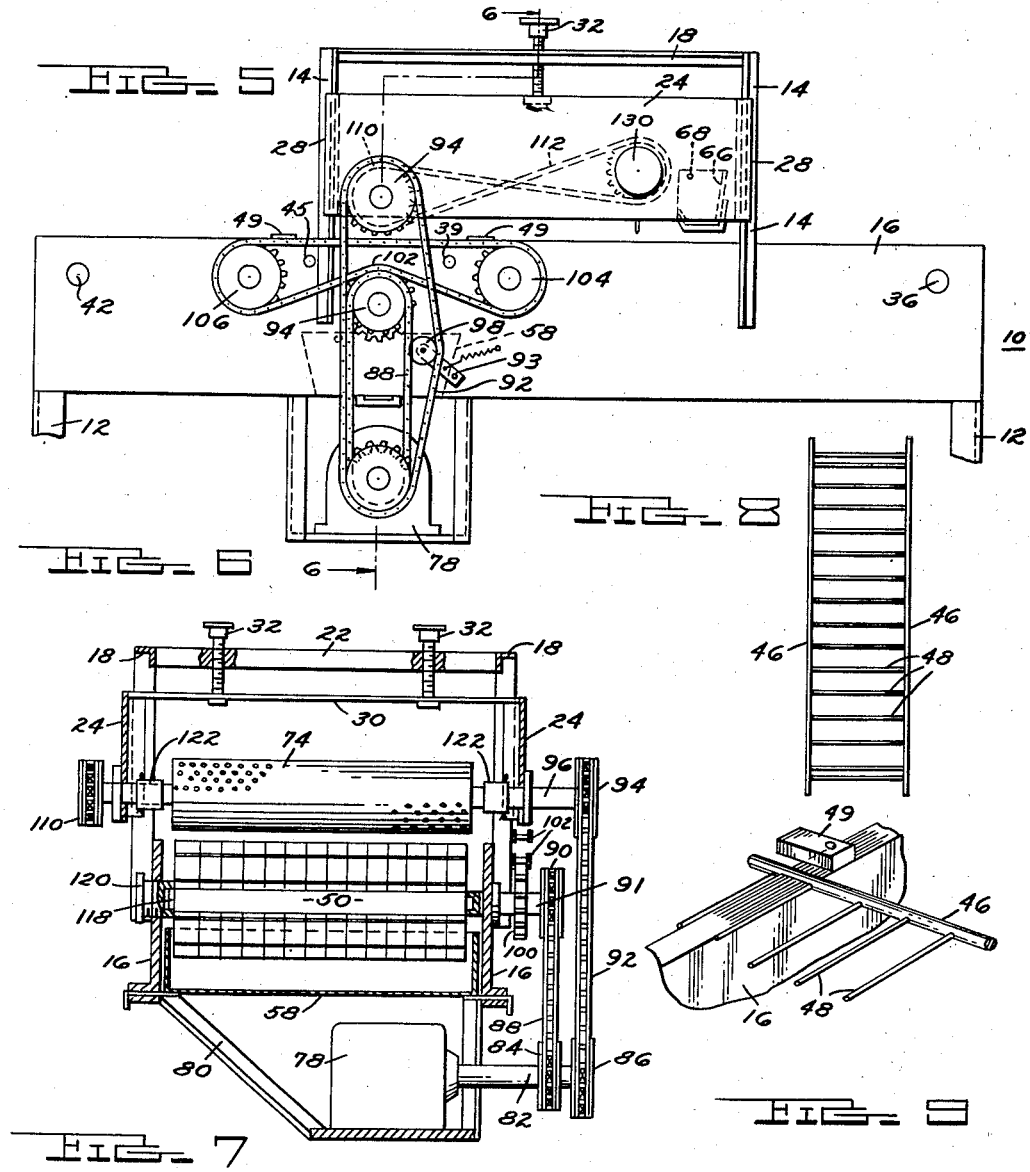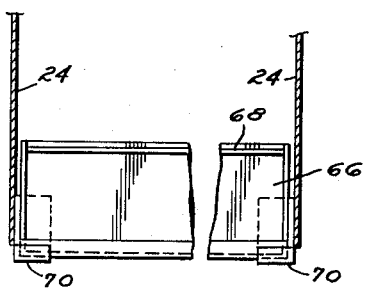

Robert M. Frazho, Harper Woods, and James C. Griffin, Detroit, Mich.

Application October 8, 1954, Serial No. 461,188

4 Claims. (Cl. 15—3.17)

This invention relates to an improved machine for cleaning meat and is particularly designed to scrape or clean pieces of meat prepared for retail sale.

An object of the invention is the provision of an improved machine for cleaning meat and particularly small pieces thereof such as chops, steaks, roasts, and the like, as the same are prepared for retail merchandising.

The manual cleaning of pieces of meat of the character described is a time-consuming job and such is particularly the case in the preparation of meat for sale in chain stores or supermarkets where pieces of meat are cut to the size for use and wrapped in suitable transparent wrappers for display. As much time is consumed in wiping off the residue from cutting up the meat from the pieces that are to be displayed as is employed in the cutting of the meat itself.

An object of this invention is to provide a small, compact, easily operable power-driven machine which is adaptable to clean off the pieces of meat that have been cut and to accomplish such result quickly and effectively.

Another object is the provision of a machine of the character described which is readily adjustable to receive pieces of meat of different size and thickness and to pass the same through the machine and deliver them cleaned and ready for packaging and sale.

More specifically the machine comprises conveyor mechanism which is adapted to advance pieces of meat over rotary cleaning devices which scrape therefrom all the loose residue that results from the cutting of the meat and satisfactorily cleans such pieces ready for wrapping for sale.

An advantage of this improved machine is that the cleaning devices are themselves readily adaptable for cleaning and replacement and the entire assembly is simple and easily operable and so constructed that it may be kept clean and sanitary.

This improved machine is so constructed that it is adaptable for use in retail as well as wholesale establishments and is economical and efficient as well as capable of meeting the full requirements of the trade.

Other objects, advantages, and meritorious features will more fully appear from the following description, claims, and drawing, wherein:

Fig. 1 is a side elevation of an embodiment of the machine partly broken away;

Fig. 2 is a horizontal sectional view taken on line 2—2 of Fig. 1;

Fig. 3 is a horizontal sectional view on line 3—3 of Fig. 1;

Fig. 4 is a fragmentary section through one of the scraping rolls showing the manner in which the scraper blades are held therein;

Fig. 5 is a side elevation of the machine partly broken away and showing the drive mechanism for the moving elements;

Fig. 6 is a sectional view taken on line 6—6 of Fig. 5;

Fig. 7 is a fragmentary section taken on the line 7—7 of Fig. 1;

Fig. 8 is a plan of the rod-supporting means disposed between the ends of the conveyors; and Fig. 9 is a fragmentary section showing the manner of securing the rod-supporting means in position.

In Figs. 1 and 5 of the drawings the base frame of the machine is indicated as 10. It is provided with supporting legs 12. A supplemental frame is supported upon the base frame as shown in Figs. 1 and 5. The end standards 14 of the supplemental frame are fixed to the side plates 16 of the base frame. These end standards 14 are connected together by linearly extending stringers 18 and end cross pieces 20. An intermediate cross piece 22 extends between the stringers 18 as shown in Figs. 2 and 6.

An adjustable supporting frame work or what might be termed a carriage is slidably supported between the end standards 14 as shown. This carriage is provided with side plates 24 connected at their ends by cross pieces 26 as shown in Fig. 3. Each cross piece has a vertical rail 28 at the end as shown in Fig. 3 which rail slidably engages the standards 14 as shown in such figure to guide the carriage in its vertical adjustment up and down with respect to the main frame for a purpose hereinafter set forth. An intermediate cross piece 30 extends between the side plates 24 and a pair of manually adjustable screw elements 32 pass threadedly through the cross piece 22 of the supplemental frame and are coupled with the cross piece 30 of the carriage. This enables the carriage to be elevated or lowered adjustably as desired.

It will be seen that the base frame is provided with conveyor mechanism and one rotary scraper roll and the carriage is provided with a rotary scraper roll and a pressure roll all as hereinafter set forth. The raising and lowering of the carriage with respect to the base frame raises and lowers the scraper roll and pressure roll of the carriage with respect to the conveyors and scraper roll of the base frame.

One of the conveyors of the base frame is indicated by the numeral 34 which is an endless belt passing over pulleys 36, 38, and 39. The other conveyor of the base frame is an endless belt indicated as 40 and it passes over pulleys 42, 44, and 45, all as shown in Fig. 1. These endless belts serve as conveyors for pieces of meat to be carried thereon. They are arranged in line. Their adjacent ends are spaced apart defining an intermediate space which is bridged by a series of parallel supporting rods secured together in a removable framework as shown in Figs. 2, 8, and 9. The employment of small diameter pulleys 39 and 45 permits the conveyor belts to be brought close to the intervening supporting framework.

This removable framework comprises end pieces 46 the ends of which are adapted to be received as shown in Fig. 9 within recesses in the side plate 16 of the base frame. A latch member 49 is swingably supported upon the side plate to be swung over the end members 46 as shown in dotted outline in Fig. 9 to hold the framework in place. These latch members may be swung as shown in solid line in Fig. 9 to permit removal of the framework for cleaning or replacement. Extending between the end pieces 46 are a plurality of laterally spaced supporting rods 48 which extend linearly of the base frame and in the same direction as the conveyors. These are spaced apart but are sufficiently close together so that pieces of meat being cleaned will not fall therethrough. For example, if the bridging framework had a width of 1', the rods 48 might be spaced apart merely 1" or thereabouts. It will be noted from Fig. 1 that bridging rods bridge a space which is very little longer than the diameter of the cleaning roll disposed therebelow.

The cleaning roll disposed below the bridging rods is supported for rotation. The roll itself is indicated as 50. It is provided with a series of slots as shown in Fig. 4 indicated as 52. These slots extend axially of the roll and are shaped as shown in Fig. 4. They are arranged spaced circumferentially about the roll. Each slot is adapted to removably receive a flexible wiper blade or squeegee blade 54. Such blade may be formed of rubber. It has a portion 56 of increased thickness along one edge which is received within the portion of the slot of increased thickness so as to hold the blade from displacement while permitting it to be withdrawn endwise from the roll.

Each blade of the roll 50 is provided with slots 51 extending inwardly from its scraper edge. Each such slot 51 is so positioned as to embrace a rod 48 so that the blade projects above such rods 48 to engage a piece of meat being carried over the rods and wipe the meat free from any scraps or coatings that adhere thereto. Disposed below the cleaning roll 50 is a collection trough 58. A scraper bar 60 is shown as extending lengthwise across the trough and is adapted to be engaged by each blade as the roll is rotated to scrape refuse material from the blade.

The adjustable framework or carriage hereinabove referred to is provided with a meat-cleaning roll indicated as 62. Such roll is rotatably supported. It, too, is provided with a series of blades 64. These blades are removably carried thereby by being fitted in slots in the roll in the manner hereinabove described in conjunction with roll 50. The blades may be flexible rubber blades of the same character as heretofore described except that these blades do not have to be provided with slots because they do not pass over rods in the manner that the rods on roll 50 do. The blades 64 of this roll 62 wipe over the upper surfaces of pieces of meat carried by a conveyor belt 34. A trough member 66 is shown as disposed adjacent to the roll 62 to collect scrapings from the blades of such roll. This trough member 66 has a scraper bar 68 extending thereacross as shown in Figs. 1 and 7. This trough member is supported between the side plates 24 of the carriage upon brackets 70 carried by such side plates as shown in Figs. 1 and 7. The forward edge of this trough is provided with a lip 72 so as to retain scrapings therein. The trough itself is removable from its supporting brackets for clean-out purposes. The same is true of the trough 58 which was heretofore described.

The carriage also supports a hold-down or pressure roll 74 which is journaled between the side plates of the carriage directly above the meat-cleaning roll 50. Such roll 74 may be formed of rubber, plastic, or of any suitable material. The carriage is adapted to be raised and lowered as heretofore described by the adjustment screws 32 and such raising and lowering adjusts the spacing of the pressure roll 74 above the cleaning roll 50 and the spacing of the cleaning roll 62 above the conveyor belt 34. This is to accommodate pieces of meat of different thickness.

To drive the conveyors and the rolls, an electric motor 78 is provided as shown in Fig. 6 being supported by a bracket 80 depending from the side plate 16 of the base frame. The drive shaft 82 of this motor carries two sprockets 84 and 86. A drive chain 88 extends from sprocket 84 to sprocket 90 mounted on a shaft which drives the cleaning roll 50. A drive chain 92 extends from sprocket 86 to sprocket 94 mounted on the shaft 96 which drives the pressure roll 74. The chain 92 extends over an idler sprocket 98 which idler has a spring control 93 thereon as shown in Fig. 5 so that it will accommodate for the raising and lowering of the carriage which carries the pressure roll 74.

The shaft which carries the sprocket 90 which drives the roll 50 also carries the sprocket 100 and the drive chain 102 extends over the sprocket 100 to sprockets 104 and 106 mounted on the shafts which carry the pulleys 38 and 44 respectively. These drive the two conveyor belts all as shown in Figs. 1, 2, 5, and 6.

The pressure roll driven as hereinabove described is provided on the end opposite the sprocket 94 with a sprocket 110 which, through a chain drive 112, is coupled with a sprocket 114 mounted on the shaft 116 which drives the cleaning roll 62 as shown in Figs. 3 and 5.

The cleaning rolls 50 and 62 are removable for replacement of squeegee blades and for cleaning and such is accomplished as shown in Figs. 3 and 6. Cleaning roll 50 has a square shaft end adjacent the shaft 91 which carries the sprocket 90 and such square end is received within a square socket in the shaft 91 to be driven therefrom. The opposite end of the cleaning roll may be provided with a round shaft end 118 received within a bearing member 120 for rotation. This bearing member is adjustable within its support so that the cleaning roll may be removed. It will appear also from Fig. 6 that the pressure roll 74 may likewise be removed. It is shown as keyed at each end and through a sleeve 122 to the stub shafts to which the sprockets 94 and 110 are secured.

The cleaning roll 62 may also be removed because it will be seen that at one end the roll has a shaft having a square end 124 received within the squared end socket of stub shaft 116 which stub shaft 116 is journaled in the bearing 126 carried by the side plate 24 of the carriage. The opposite end of the roll has a cylindrical stub shaft 128 which is received within a bearing 130 threadedly secured to the side plate 24 for adjustment to permit removal of the roll.

In the operation of the machine, pieces of meat are placed upon the conveyor belt 34 which travels in the direction of the arrows and carries such pieces underneath the cleaning roll 62. The wiper blades of such roll travel over the meat and wipe the same and the scrapings are deposited in the trough 66. This trough as above stated may be removed for cleaning. From the conveyor belt 34 the meat passes onto the bridging rods 48 which extend over the cleaning roll 50 and under the pressure roll 74. The wiper blades 54 of the cleaning roll 50 and the pressure roll 74 together with the push given by succeeding pieces of meat being carried onto the rods carries the pieces between the pressure roll 74 and the cleaning roll 50. Such pieces are therefore wiped as they travel over the rods and they may then come upon the conveyor belt 40 from which they may be picked up and packaged.

It will be seen that the cleaning roll 62 cleans one surface of the pieces and the cleaning roll 50 cleans the opposite surface. As stated the wiper blades 54 of the roll 50 are slotted to embrace the bridging rods 48. As also stated the carriage is adapted to be raised and lowered to accommodate pieces of varying thickness.

What I claim is:

1. In a machine for cleaning pieces of meat, conveyor means for advancing pieces of meat linearly therealong, a meat-cleaning roll rotatably supported spaced above said conveyor and extending transversely thereof, said roll provided with a series of circumferentially spaced apart axially extending flexible squeegee blades projecting radially of and beyond the circumference of the roll and adapted to wipe pieces of meat being advanced thereunder by the conveyor, a plurality of meat-supporting rods arranged in line with one end of the conveyor and as an extension thereof, said rods extending in the same direction as the conveyor but spaced apart transversely thereof, a second meat-cleaning roll rotatably supported spaced below said rods and extending transversely thereof, said roll provided with a series of circumferentially spaced apart axially extending flexible squeegee blades extending axially of the roll and projecting radially beyond the circumference of the roll a distance greater than the distance from the rods to the circumference of the roll, said blades being provided with radial slits in line with the rods permitting portions of the blades between the slits to pass upwardly between the rods and wipe pieces of meat being advanced over the supporting rods, rotatably supported pressure means spaced above said rods adapted to hold pieces of meat delivered to the rods by the conveyor against the rods and advance the same over the rods, and means for driving said rolls and rotatable pressure means.

2. A machine for cleaning pieces of meat as defined in claim 1 characterized in that a trough is provided associated with each roll and extending linearly thereof and sufficiently closely adjacent thereto that the margins of the blades of the roll pass through the trough during the rotation of the roll, each of said troughs being provided with a cleaning member extending lengthwise thereof and disposed within the trough and disposed in such position therein that the blades of the roll wipe over the cleaning members as they pass through the trough.

3. A machine for cleaning pieces of meat as defined in claim 1 characterized in that each squeegee blade is removably supported within a slot in its roll, said roll being provided with a series of slots extending axially of the roll and projecting radially through the circumference thereof, each slot having a bottom portion of greater width than the portion of the slot intervening between said bottom and the circumference of the roll, and each squeegee blade having an edge portion of greater width than the remainder of the blade and adapted to be received within the bottom portion of the slot to hold the blade within the slot.

4. A machine for cleaning pieces of meat as defined in claim 1 characterized in that a trough is provided associated with each roll and extending linearly thereof and sufficiently closely adjacent thereto that the margins of the blades of the roll pass through the trough during the rotation of the roll, each of said troughs being provided with a cleaning member extending lengthwise thereof and disposed within the trough and disposed in such position therein that the blades of the roll wipe over the cleaning members as they pass through the trough, each squeegee blade being removably supported within a slot in its roll, said roll being provided with a series of slots one for each blade extending axially of the roll and projecting radially through the circumference thereof, each slot having a width at its bottom portion greater than the width of the slot at the circumference of the roll, each squeegee blade having a width conforming with the dimension of the slot whereby the blade is held within the slot against accidental displacement, said first mentioned roll and said rotatable pressure means being adjustable toward and away from the plane of the conveyor.

References Cited in the file of this patent

UNITED STATES PATENTS

| | | |
|---|---|---|
| 460,002 | Dula | Sept. 22, 1891 |
| 554,707 | Michner | Feb. 18, 1896 |
| 1,670,809 | Hormel | May 22, 1928 |
| 1,802,587 | Tavender | Apr. 28, 1931 |
| 2,637,870 | Cohen | May 12, 1953 |
| 2,638,617 | Doering | May 19, 1953 |
| 2,677,142 | Mundo | May 4, 1954 |